United States Patent [19]

Womack

[11] 4,299,294
[45] Nov. 10, 1981

[54] ROTARY TOOL WITH AXIAL FEED

[75] Inventor: Robert C. Womack, Dallas, Tex.

[73] Assignee: AAA Products International, Inc., Dallas, Tex.

[21] Appl. No.: 120,560

[22] Filed: Feb. 11, 1980

[51] Int. Cl.³ .................... B23Q 5/027; B23B 45/04
[52] U.S. Cl. .................................... 173/148; 408/130
[58] Field of Search ................ 173/148, 141, 150; 408/124, 130, 705

[56] References Cited

U.S. PATENT DOCUMENTS

| | | | |
|---|---|---|---|
| 2,932,192 | 4/1960 | Hansen | 408/130 X |
| 3,200,426 | 8/1965 | Barr | 408/130 X |
| 3,299,783 | 1/1967 | Mazue | 408/130 X |
| 3,528,510 | 9/1970 | Peterson | 173/148 |
| 3,663,138 | 5/1972 | Petroff | 408/130 |
| 4,105,361 | 8/1978 | Petroff | 408/130 |

*Primary Examiner*—Ronald Feldbaum
*Attorney, Agent, or Firm*—Peter J. Murphy

[57] ABSTRACT

The tool includes an elongated body, rectangular in cross-section and having a switch housing mounted on one side face, to enable the mounting of an array of such tools in close side-by-side relation. A hydraulic motor, rotary drive spindle, and extensible quill are mounted relative to the housing about a common rotary and extension axis. The drive spindle has an external spline at its rear end, for engagement with an internally splined drive coupling which is secured to the motor drive shaft by means of a special key arrangement to prevent axial movement of the drive coupling. The quill is extended by a fluid operated cylinder-piston structure; and the front end of the drive shaft is supported within the front end of the quill by means of a uniquely mounted bearing. The bearing is mounted at the squared front end of the quill for precise axial and squared alignment; and is also confined between the spindle drive shaft and spindle end for precise axial and squared alignment relative to the spindle.

16 Claims, 9 Drawing Figures

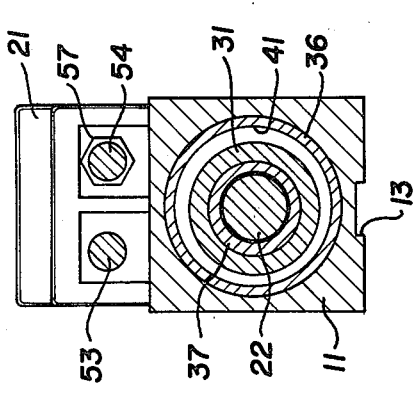
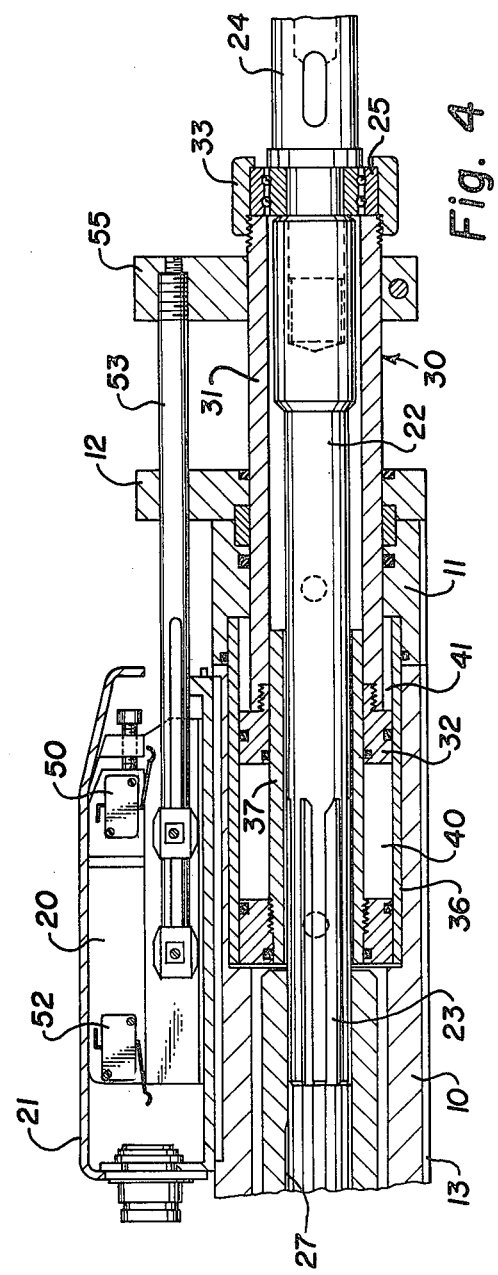

ROTARY TOOL WITH AXIAL FEED

BACKGROUND AND SUMMARY OF THE INVENTION

This invention relates to a heavy duty rotary tool adapted for mounting on a fixture; and particularly to such tool for drilling, tapping or plug setting which is compact, and which is powerful in relation to its size.

A principal object of this invention is to provide such a tool of very compact size, for performing heavy duty drilling, tapping, plug setting or similar operations.

Another object of this invention is to provide such a tool having small lateral dimensions, to enable close side-by-side mounting of a plurality of such tools.

A further object of this invention is to provide such a tool having a hydraulic motor driven spindle, and having a fluid operated extensible and retractible spindle quill.

Still another object of this invention is to provide such tool which is simple and rugged in construction, enabling economy of manufacture and extended useful life.

A still further object of this invention is to provide such a tool having a novel bearing structure for coupling the quill and the rotating spindle.

Another object of this invention is to provide such a tool having novel coupling for retaining the spindle drive spline on the motor shaft.

A further object of this invention is to provide such a tool which is self-contained, which is operated by either hydraulic fluid or a combination of hydraulic and pressure fluid, and which is adapted for remote control operation.

These objects are accomplished in a rotary tool which comprises an elongated body providing a longitudinal drive and feed axis. A spindle, having means at its forward end for supporting a work element, is rotatably supported on that axis. A rotary motor is mounted at one end of the body to provide rotary drive of the spindle; and a rotary and sliding coupling is provided between the motor and the spindle. A quill is mounted for longitudinal movement relative to the body along that axis; and the body and quill have coacting cylinder and piston means for effecting extension and retraction of the quill by means of a motive fluid. A combination rotary and thrust bearing, mounted at the front face of the quill, supports the spindle for relative rotation and for axial movement with the quill.

More particularly the quill has a squared front end; and a bearing retainer clamps the bearing to the squared quill end in precise concentricity with the quill axis. The spindle includes a drive shaft and a spindle end for supporting the work element. The drive shaft and spindle end have a respective cylindrical bore and shank dimensioned for a push fit, for precise axial alignment of those parts. The shaft has a squared front end and the spindle end has a squared shoulder contiguous to the shank; and these parts have coacting threads for securing the parts together to clamp the bearing mounted concentrically on the shank, between the end face and shoulder.

The novel features and the advantages of the invention, as well as additional objects thereof, will be understood more fully from the following description when read in connection with the accompanying drawings.

DRAWINGS

FIG. 3 is a transverse sectional view taken along the line 3—3 of FIG. 1;

FIG. 4 is a partial longitudinal sectional view, similar to FIG. 1, showing the spindle in extended condition;

DESCRIPTION OF THE PREFERRED EMBODIMENT

Figure 1:
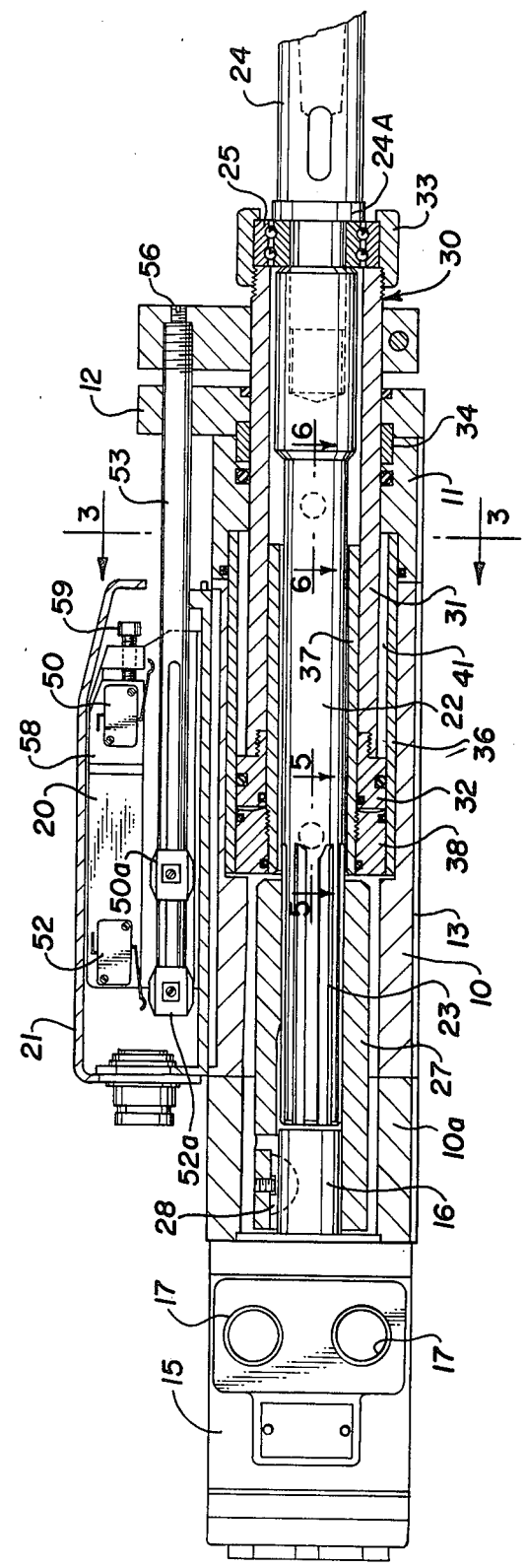
FIG. 1 is a longitudinal sectional view of a tool embodying the present invention.
Figure 2:
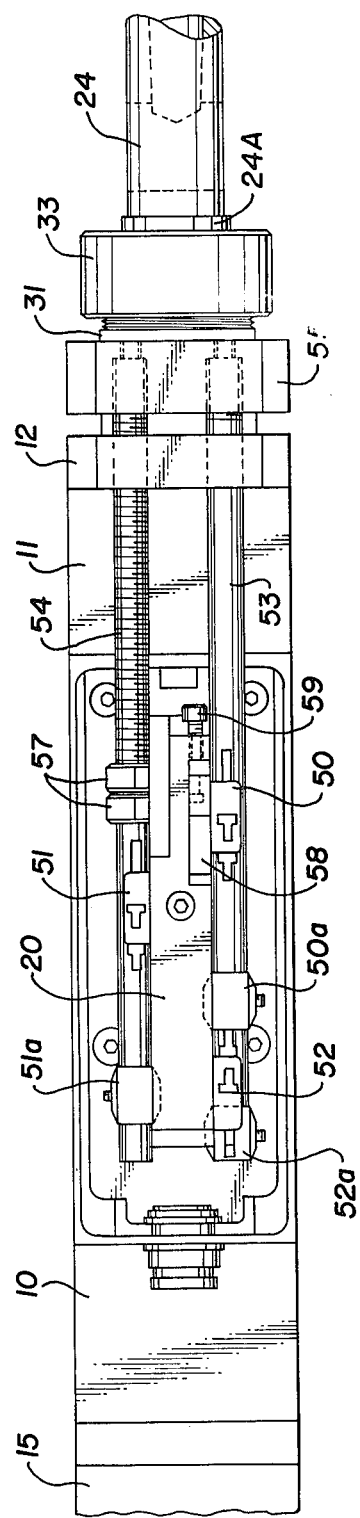
FIG. 2 is a top view of the tool of FIG. 1, with the switch cover removed.

The tool body or housing consists of a main body 10, a rear body 10a and a front body 11. The front body is secured to the main body, preferably, by means of tap screws which pass through a torque plate 12, mounted at the front end of the front body, and through the front body. The tool body is elongated and square in rectangular cross section, having for example transverse side dimensions of only 3¼ inches, with an overall length of about 14 inches. A central longitudinal alignment groove 13 may be provided along the bottom wall of the body, for the purpose of aligning the tool in a suitable supporting fixture; and such alignment grooves may also be provided along one or both sides of the body if desired. The body parts are hollow and are machined to provide a longitudinal axis for the parts to be described, which axis is the central axis of the body.

A suitable rotary hydraulic motor 15 is mounted at the rear end of the rear body 10a with its ouput shaft 16 extending into the main body in alignment with the central axis. This tool will be driven and controlled by a suitable hydraulic power unit, which may consist for example of a portable support base, a reservoir for hydraulic fluid, a pump and associated electric drive motor, and suitable controls. Hydraulic fluid is supplied to and from the motor 15 by suitable hydraulic conduits 17.

A switch mounting plate 20 is mounted at the top of the main body for supporting several control switches to be described; and these switches along with switch operating mechanisms to be described are enclosed by a switch cover 21.

The spindle is rotatably supported in the body by the coupling with the hydraulic motor output shaft at its rear end, and by a bearing mounting at the forward end of an extensible quill 30. The spindle consists of a drive shaft 22 having an external spline 23 at its rear end, and a spindle end 24 threadedly secured at the forward end of the drive shaft. A frictionless rotary thrust bearing 25 is confined between the drive shaft and the spindle end. The illustrated spindle end is a #3 Morse taper end; however any suitable type of spindle end may be used for the mounting of a suitable working element or chuck.

In order to provide for precise alignment of the drive shaft, the spindle end, and the rotary-thrust bearing, the forward end of the drive shaft is provided with a bore including a threaded bore 26A and a counterbore 26B. This bore is dimensioned to receive the shank of the spindle end 24. The spindle end includes an intermediate collar 24A, and a rear shank including a cylindrical portion 24B adjacent to the collar and an externally threaded tip end 24C. The shaft counterbore 26B and the shank portion 24B are machined for a push fit to provide for precise alignment of these parts; and the threaded portions of course secure the parts together. The front face of the drive shaft 22 and the rear face of the spindle end collar 24A are squared, so that the bearing 25 confined between these faces is very well aligned. The bore of the bearing inner race and the shank portion 24B are dimensioned for a light push fit, also for precise alignment with the associated parts. The threads on the drive shaft and spindle end are right hand threads to that, during use with the prevalent right hand or clockwise drive of the spindle, the drag on the spindle end will always tend to maintain the bearing very tightly confined between the shaft 22 and the spindle end 24. The associated mounting structure for the bearing outer race is discussed below.

Figures 8, 9:
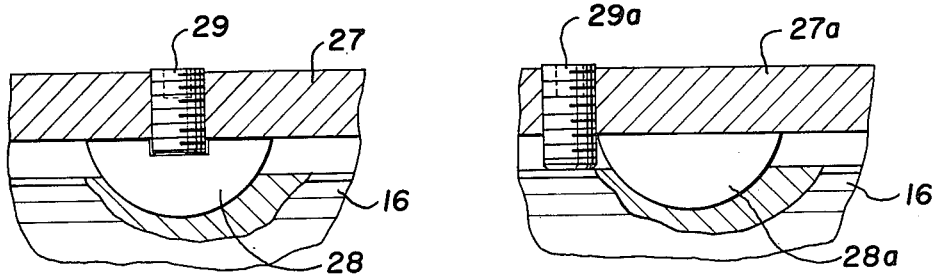
FIG. 8 is an enlarged fragmentary view showing the key arrangement of FIG. 1 for coupling the drive sleeve to the motor output shaft.
FIG. 9 is a fragmentary view showing an alternative key arrangement for coupling the drive sleeve of the motor output shaft.

The drive coupling between the hydraulic motor 15 and the drive shaft 22 is provided by a drive sleeve 27, having an internal spline at its forward end for engagement with the drive shaft spline 23, and having a groove at its rearward end for accommodating a Woodruff key 28. As best seen in FIGS. 1 and 8, in order to restrain forward axial movement of this drive sleeve 27 relative to the motor output shaft 16, the flat edge of the Woodruff key 28 is provided with a notch for receiving the tip of a set screw 29 provided for binding the key within the shaft groove. With this arrangement the set screw functions with the key notch to prevent axial movement of the drive sleeve relative to the motor output shaft. This is important since the motor shaft is hard, and without some special arrangement, axial forces acting on the drive sleeve may slip it off the motor shaft. With the arrangement of FIG. 8, should the sleeve 27 start to move axially the key will be rotated by the set screw and therefore locked more tightly in its grooves.

An alternative arrangement for this purpose is illustrated in FIG. 9. In this arrangement the Woodruff key 28a is conventional; and a set screw 29a is mounted in the drive sleeve to the rear of the Woodruff key, with the tip end of the set screw extending to engage the output shaft 16 behind the key.

With this arrangement, should the sleeve 27 start to move axially forward the key, again, will be rotated by the set screw and locked more tightly. With either of the locking arrangements of FIG. 8 and FIG. 9, proper operation of the tool is assured since the drive sleeve cannot be pulled off the motor shaft 16 by the sliding force acting between these members.

The extensible quill 30 consists of the assembly of a sleeve 31, a piston 32 threaded into the rear end of the sleeve, and an annular bearing retainer 33 threaded onto the front end of the sleeve. The bearing retainer has an internal cylindrical bore dimensioned for a light push fit with the outer race of the bearing 25; and the retainer is provided with a squared internal lip for very tightly and accurately confining the bearing against the squared forward end face of the quill sleeve. Assuming that most operations of the tool will call for right hand rotation of the spindle, the threaded connection between the sleeve and bearing retainer is with left hand threads, so that any tendency of the bearing retainer to rotate during operation will function to effect the tightening of the retainer rather than the loosening thereof. This described arrangement of the support bearing between the quill and spindle enables the provision of a larger spindle in relation to the quill, and also a larger heavier duty bearing. The effect of this is to enable the provision of a larger capacity tool, while keeping the overall lateral dimensions as small as possible. Additionally, with the bearing being mounted externally of the quill sleeve, rather than internally thereof, there is no opportunity for compression of the bearing by members which may be clamped on the forward end of the quill sleeve. Such compression may interfere with normal bearing operation and reduce bearing life.

The front end of the quill is slidably supported relative to the front body 11 by means of a bronze guide bushing 34, confined between the front body and the torque plate 12. The rear end of the quill is supported within an annular cylinder assembly which consists of: a barrel 36 defining the outer cylinder wall, a tube 37 defining the inner cylinder wall, and a cylinder end 38 threadedly secured to the tube 37.

An inner cylinder chamber 40, then, is defined between the rear face of the quill piston 32 and the above described cylinder assembly. An outer cylinder chamber 41 is defined between the forward face of the quill piston, the outer wall of the quill sleeve 31, and the inner walls of the barrel 36 and the front body 11. All of these piston and cylinder chamber parts are sealed relative to each other by suitable O-rings.

Figures 5, 6:
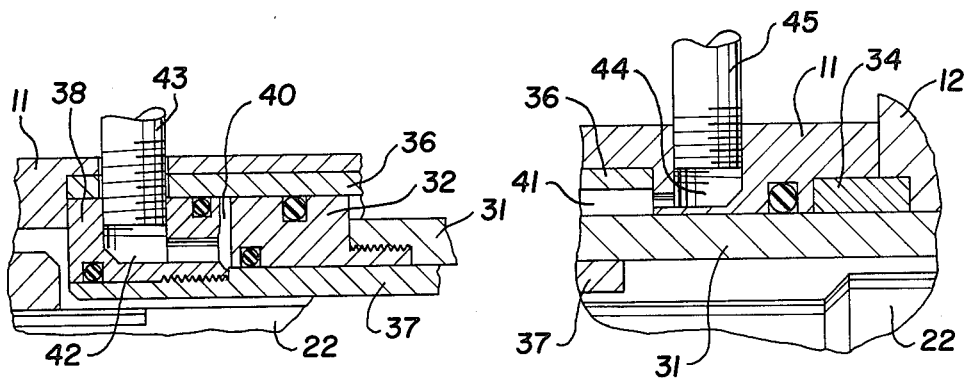
FIG. 5 is a fragmentary sectional view taken along the line 5—5 of FIG. 1.
FIG. 6 is a fragmentary sectional view taken along the line 6—6 of FIG. 1.
Figure 7:
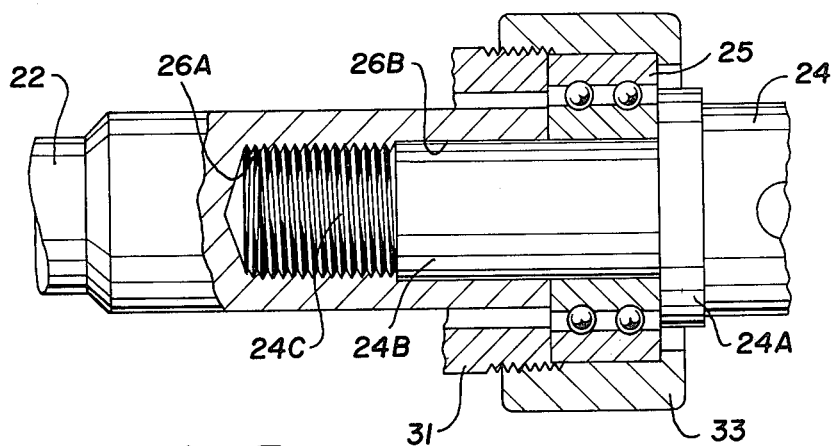
FIG. 7 is a fragmentary sectional view illustrating the drive shaft-spindle end coupling.

As best seen in FIG. 5, the motive fluid for the inner cylinder chamber 40 is supplied through an L-shaped passage 42 provided in the cylinder end 38, and a suitable conduit 43 threaded into that passage. Similarly the motive fluid for the outer cylinder chamber 41 is supplied through an L-shaped passage 44 provided in the front body 11, and a suitable conduit 45 threaded into that passage. The supply passages and associated conduits, of course, provide for return of the fluid during venting of the respective cylinder chambers.

The controls for the tool include a retract switch 50, a rapid advance switch 51, and a rear limit switch 52, all of which are mounted on the above mentioned switch mounting plate 20. These switches are operated by switch dogs 50A, 51A and 52A for the respective switches, and which are mounted on dog rods 53 and 54. These dog rods extend parallel to the tool axis and are threadedly secured at their forward end to a mounting plate 55 which is, in turn, secured by means of a C clamp to the forward end of the spindle sleeve 31. The dog rods are provided with longitudinal flats for rotational location of the dogs; and locking set screws 56 fix the rotational positions of the rods. The dog rods pass through suitable bores in the torque plate 12, for preventing rotation of the quill relative to the tool body. The dog rod 54 is threaded for a substantial part of its forward length; and a pair of lock nuts 57 are provided, and adapted to be positioned to engage the rear face of the torque plate 12 to provide a positive forward limit in the event of malfunction of the retract switch 50.

The switch dogs are adjustably mounted on the dog rod 53 and 54, being secured by means of suitable set screws; and are therefore positionable to determine the operation of the switches at appropriate axial positions of the quill. The switch mounting includes an adjustment block 58 for supporting the retract switch 50, which adjustment block is mounted for longitudinal reciprocating movement relative to the switch mounting plate assembly 20. An adjustment screw 59 is threaded through an internally threaded boss of the switch plate, and is coupled to the adjustment block to provide for fine longitudinal adjustment of the block 58 and corresponding fine positioning of the retract switch. This enables very precise control of drilling or tapping depth for example.

OPERATION

The operation of the tool will be apparent from the foregoing description, and the following briefly describes some of the operational features.

The control for the tool will be provided by a combination of the above described control switches and associated control mechanism, and the controls provided on the remote and associated power unit referred to above. The operation of the hydraulic motor is provided by the control unit; and when the tool is used for plug setting or similar operation, a suitable torque control may be provided by adjusting the overload release control for the hydraulic motor. With this overload release control, the ultimate torque applied by the tool may be controlled fairly accurately.

The initiation of the quill feed will also be controlled by this control unit, where hydraulic fluid is the motive fluid for the feed and retract operations; or by an associated control unit wherein air is the motive fluid. In order to minimize operation time, the feed of the quill may be rapid up to a point where the working element approaches the work piece; at which point the rapid advance switch 51 will be operated by its associated switch dog 51A to shift the feed into a lower feed rate. The lower rate may be desirable to prevent damage to the workpiece and/or the working tool when it engages the workpiece. This change in feed rate may be accomplished by appropriate control of the motive fluid through suitable valves, for example.

The retract switch 50 will, of course, effect the reversal of the motive fluid flow from the inner cylinder chamber 40 to the outer cylinder chamber 41, to effect retraction of the quill. By way of example, the quill will retract at a rate of speed 2.30 times faster than the rapid feed rate of the quill, with the same oil supply. The rear limit switch 52 may be employed, for example, to shut off the tool, or to condition the tool, or possibly a battery of tools for the succeeding operation. If a battery of tools are used, for example, at a fixed station for performing simultaneously several operations on a workpiece, the rear limit switch may be employed to retain all tools in the rear limit position until the operation of each tool is completed and to then signal conveyor movement to move that workpiece away from the station.

FEATURES AND ADVANTAGES

The feature and advantage of the tool according to the invention which is provided with a hydraulic motor, is that it provides a very powerful tool for drilling, tapping or plug setting operations which is yet very compact. The compactness of the tool enables the mounting of a plurality of tools in side-by-side relation for performing simultaneous operations on a single workpiece. As an example of the capability of the described tool, a tool having the dimensions referred to above (14 inch body with an external square section of $3\frac{1}{4}$ inches) can drill a $1\frac{1}{4}$ inch hole in mild steel.

A particular feature of the hydraulic rotary drive for the tool is that it provides a high torque drive for rotary operations, enabling the high capacity drilling, tapping and other operations with a very compact tool. Another advantage is that, where torque control is desired, the overload relief for the hydraulic motor supply may be utilized to provide that torque control. Tightening torque, up to 4000 inch-pounds, can be adjusted by setting that relief valve. For heavy duty drilling and tapping operations, the feed may need to be correspondingly powerful; and the hydraulic feed of the quill will provide for a feed situation which approaches positive feed. This may be particularly desirable for the drilling of certain materials where case hardening occurs if the drill bit does not penetrate the work at a consistent rate. In situations where a lighter and less positive feed is required, air may be the suitable motive fluid. For hydraulic feed, the control unit which provides the fluid for the rotary motor may be well adopted to provide the fluid for the spindle feed and retract.

The tool may be used as a very versatile tapping tool; and any lead tap may be used since the feed of the quill is independent of the lead of the tapping threads. The desired quill feed can be provided to follow the lead of the tap as desired.

An important feature of the invention is the quill-spindle-bearing structure. This structure provides a number of advantages. One advantage is that the bearing is maintained in perfect alignment with both the spindle assembly and the quill assembly. This is accomplished by the fact that the bearing is dimensioned for a light push fit with the spindle end shank and also with the quill bearing retainer, and also by the fact that the faces which confront both the inner and outer races of the bearing are perfectly squared relative to the rotational axis. Another aspect is that the coupling threads for the spindle shaft and end assembly, on the one hand, and the quill sleeve and bearing retainer, on the other hand, are of the proper hand that the bearing is always tightly confined and maintained in perfect alignment. Another advantage of this structure is that, with the bearing being mounted at the front face of the quill sleeve, a larger spindle assembly may be provided and a larger heavier duty bearing may be provided to produce a higher capacity tool without increasing the overall tool size. A third advantage is that, with the bearing mounted at the front face of the quill sleeve rather than inside the quill sleeve, there is no opportunity for the bearing to be affected by compressive forces resulting from the clamping of a member onto the quill sleeve such as the described dog rod mounting plate or multiple drill heads. All of these advantages contribute to a tool of desired precision, a tool having maximum capacity for its size, and a tool which minimizes the possibility of bearing or quill damage due to a loose or misaligned bearing slipping on its shaft or in its housing.

A particular feature of the invention is the manner of mounting the spindle drive sleeve on the hard motor output shaft, to resist axial movement of the drive sleeve which may be encouraged by axial drag between the drive splines.

While the preferred embodiment of the invention has been illustrated and described, it will be understood by those skilled in the art that changes and modifications may be resorted to without departing from the spirit and scope of the invention.

What is claimed is:
1. A rotary tool comprising an elongated body providing a longitudinal drive and feed axis;

a spindle rotatably supported on said axis, having means at its forward end for supporting a work element; a rotary motor mounted at one end of said body to provide rotary drive of said spindle; means providing a rotary and sliding coupling between said motor and said spindle;

a quill mounted within said body for relative longitudinal movement along said axis; said body and said quill having coacting means for effecting extension and retraction of said quill;

a combination rotary and thrust bearing mounted at the front face of said quill, supporting said spindle for relative rotation and for axial movement with said quill;

said quill having a squared front end face, and including a bearing retainer mounted on the front end thereof for securing said bearing against said end face in precise squared and coaxial alignment with said quill;

said spindle comprising a drive shaft and a spindle end having coacting means providing coaxial coupling thereof and providing precise coaxial alignment thereof; said drive shaft having a squared front end face, and said spindle end having a face confronting said drive shaft end face for confining said bearing in precise squared alignment therewith; and said spindle end having means supporting said bearing means in precise coaxial alignment therewith.

2. A rotary tool comprising an elongated body providing a longitudinal drive and feed axis;

a spindle rotatably supported on said axis, having means at its forward end for supporting a work element; a rotary motor mounted at one end of said body to provide rotary drive of said spindle; means providing a rotary and sliding coupling between said motor and said spindle;

a quill mounted within said body for relative longitudinal movement along said axis; said body and said quill having coacting means for effecting extension and retraction of said quill;

a combination rotary and thrust bearing mounted at the front face of said quill, supporting said spindle for relative rotation and for axial movement with said quill;

said quill having a squared front end face; a bearing retainer having means coacting with said quill for clamping said bearing against said squared end face; said bearing retainer having a cylindrical internal wall for confining said bearing and having a squared face confronting said quill squared end face, to provide precise coaxial and squared alignment of said bearing with said quill.

3. A rotary tool as set forth in claim 2 said quill and said bearing retainer having coacting threads for coupling said bearing retainer to said quill; said threads having a hand to effect the tightening of said threaded coupling during drive of said spindle in the prevalent direction of rotation, should the bearing urge rotation of said retainer.

4. A rotary tool as set forth in claim 3 the prevalent direction of rotation of said spindle being right hand; and said coupling threads being left hand threads.

5. A rotary tool as set forth in claim 2 said spindle comprising a drive shaft and a spindle end; said drive shaft having a cylindrical axial bore at its forward end; said adaptor having a reduced diameter cylindrical shank at its rearward end, and means defining an intermediate contiguous annular shoulder; said shank dimensioned to be received in said drive shaft bore with a push fit, for precise axial alignment of said shaft and spindle end; said shank having a portion contiguous to said shoulder, dimensioned for a push fit with said bearing; and means for coupling said spindle end to said shaft for confining said bearing axially between said shoulder and the end face of said shaft.

6. A rotary tool as set forth in claim 5 said spindle shaft end face and said spindle end shoulder having squared confronting faces for engagement with said bearing.

7. A rotary tool as set forth in claim 5 said drive shaft bore including a reduced diameter internally threaded recess; and said spindle shank having an externally threaded tip for threaded coupling of said drive shaft and said spindle end.

8. A rotary tool as set forth in claim 7 said threads of said recess and said shank having a hand to effect the tightening of said threaded coupling in response to the normal rotational drag of said spindle end, during drive of said spindle in the prevalent direction of rotation.

9. A rotary tool as set forth in claim 2 said bearing having inner and outer races;

said quill including a sleeve having a squared front end face; a bearing retainer collar having an inward directed retaining flange providing a bearing clamping face; said quill sleeve and said bearing retainer collar having coacting threads for securing said retainer collar to said sleeve, with said flange face confronting said quill sleeve end face, to clamp the outer race of said bearing;

said spindle comprising a drive shaft and a spindle end; said drive shaft having a squared front end face and a cylindrical axial bore opening to said front face; said spindle end having a rearward cylindrical axial shank and means defining a squared shoulder contiguous to said shank; said bore and said shank being dimensioned to interfit with a push fit, for precise axial alignment; and said drive shaft and said spindle end having coacting thread means for securing said parts together with said collar face confronting said shaft end face to clamp the inner race of said bearing;

said bearing outer race being dimensioned to be received in said retainer collar with a light push fit, and said inner bearing race being dimensioned to be received on said spindle end shank with a light push fit.

10. A rotary tool as set forth in claim 2 said rotary motor comprising a hydraulic motor.

11. A rotary tool as set forth in claim 1 a plurality of control switches mounted on said body at one side thereof;

at least one elongated dog rod mounted on said quill and extending parallel to said quill; dog means adjustably mounted on said rod for actuating at least one control switch; and a mounting plate for said dog rod clamped to said quill adjacent to the forward end thereof, being spaced axially from said bearing.

12. A rotary tool as set forth in claim 11 a torque plate mounted at the forward end of said body; said torque plate having a bore passing said dog rod in sliding relation, to prevent rotation of said quill relative to said body.

13. A rotary tool as set forth in claim 11
an adjustment block mounted for reciprocating longitudinal movement relative to said body; one of said support switches being secured to said adjustment block; an adjustment screw threadedly mounted in said body on an axis parallel to the spindle axis; and means coupling said adjustment screw to said adjustment block for fine axial positioning of said one control switch.

14. A rotary tool comprising
an elongated body providing a longitudinal drive and feed axis;
a spindle rotatably supported on said axis, having means at its forward end for supporting a work element; a rotary motor mounted at one end of said body having a drive shaft disposed in said axis; means providing a rotary and sliding coupling between said motor shaft and said spindle;
a quill mounted within said body for relative longitudinal movement along said axis; said body and said quill having coacting means for effecting extension and retraction of said quill;
a combination rotary and thrust bearing mounted at the front face of said quill, supporting said spindle for relative rotation and for axial movement with said quill;
said coupling comprising a drive sleeve having an internal spline at its forward end and an internal key groove at its rearward end, an arcuate Woodruff key groove in said motor shaft, and a Woodruff key disposed in both said key grooves; said drive sleeve having a transverse bore opening to said internal key groove, and pin means disposed in said bore and extending into said internal groove in interfering relation with said Woodruff key, to limit axial movement of said drive sleeve relative to said motor shaft.

15. A rotary tool as set forth in claim 14
said pin means comprising a set screw threaded into said bore.

16. A rotary tool as set forth in claim 14
said Woodruff key having a notch in its straight edge, intermediate its ends; and said notch being dimensioned to receive the tip end of said pin means.

* * * * *

UNITED STATES PATENT AND TRADEMARK OFFICE
CERTIFICATE OF CORRECTION

PATENT NO. : 4,299,294
DATED : November 10, 1981
INVENTOR(S) : Robert C. Womack

It is certified that error appears in the above—identified patent and that said Letters Patent are hereby corrected as shown below:

Column 2, line 21    change "of" to --to--;

Column 5, line 68    change "1 1/4" to --1 3/4--.

*Signed and Sealed this*

*Seventeenth* Day of *January 1984*

[SEAL]

*Attest:*

GERALD J. MOSSINGHOFF

*Attesting Officer*     *Commissioner of Patents and Trademarks*